(12) United States Patent
Zonneveld

(10) Patent No.: US 6,542,571 B2
(45) Date of Patent: Apr. 1, 2003

(54) METHOD OF REDUCING ARTIFACTS IN OBJECT IMAGES

(75) Inventor: Frans Wessel Zonneveld, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/107,007

(22) Filed: Mar. 26, 2002

(65) Prior Publication Data

US 2002/0150200 A1 Oct. 17, 2002

(30) Foreign Application Priority Data

Mar. 29, 2001 (EP) .............................................. 01201180

(51) Int. Cl.$^7$ ................................................. A61B 6/03
(52) U.S. Cl. .................................. 378/4; 378/8; 378/901
(58) Field of Search ............................ 378/4, 8, 15, 901

(56) References Cited

U.S. PATENT DOCUMENTS 5,416,815 A * 5/1995 Hsieh .............................. 378/4
5,818,896 A * 10/1998 Hsieh .............................. 378/15
6,044,125 A * 3/2000 Flohr et al. ...................... 378/4
6,215,841 B1 * 4/2001 Hsieh .............................. 378/8

* cited by examiner

Primary Examiner—David V. Bruce
(74) Attorney, Agent, or Firm—John Vodopia

(57) ABSTRACT

The invention concerns a method of reducing artifacts in object images acquired by means of measurement signals sent by a source through the object onto a detector, which method comprises the steps of: a) adaptively filtering the data signals received by the detector in dependence of the data value; b) processing the data signals to indicate the attenuation of the measurement signals passing through the object; and c) reconstructing an image of the object based on the filtered and processed data signals. The method according to the invention is characterized in that step b) is performed on the adaptively filtered data signals resulting from step a).

10 Claims, 1 Drawing Sheet

METHOD OF REDUCING ARTIFACTS IN OBJECT IMAGES

The present invention relates to a method of reducing artifacts in object images acquired by means of measurement signals sent by a source through the object onto a detector, which method comprises the steps of: a) adaptively filtering the data signals received by the detector in dependence of the data value; b) processing the data signals to indicate the attenuation of the measurement signals passing through the object; and c) reconstructing an image of the object based on the filtered and processed data signals.

The invention also relates to a computed tomography device.

A method and a computed tomography device of this kind are known from U.S. Pat. No. 5,416,815.

The known computed tomography device includes an X-ray source and an X-ray detector which can rotate together about the object to be examined, notably a patient. Using the known method, the known computed tomography device acquires a plurality of cross-sectional images of the object along mutually parallel planes having a predetermined orientation. The cross-sectional images are acquired notably along a number of mutually parallel planes. This is achieved by rotating the X-ray source and the X-ray detector about the object while displacing the object and the X-ray detector and the X-ray source relative to one another. It is thus achieved that a cross-sectional image is acquired each time along the plane in which the X-ray detector and the X-ray source rotate about the object. Subsequently, the X-ray source with the X-ray detector and the object are displaced relative to one another, so that the plane in which the X-ray source and the X-ray detector rotate about the object is shifted and a next cross-sectional image is acquired. The cross-sectional images relate to a (sub)volume of the object.

According to the known method first the data signals are processed to indicate the attenuation of the measurement signals passing through the object. Usually this step involves a log adjustment by taking the negative logarithm of the data signals. Next the data signals received by the detector are adaptively filtered in dependence of the data signal value.

The known method has the drawback that very small data signals thereby introduce errors known as streak artifacts leading to so called "frozen noise".

It is an object of the invention to provide a method and a computed tomography device of the kind as described in the preamble in which streak artifacts are greatly reduced.

The method according to the invention is characterized in that step b) is performed on the adaptively filtered data resulting from step a).

The computed tomography device according to the invention comprises a processing unit for carrying out the method according to the invention.

The invention further refers to a computer program for carrying out the method according to the invention.

Figure 1:
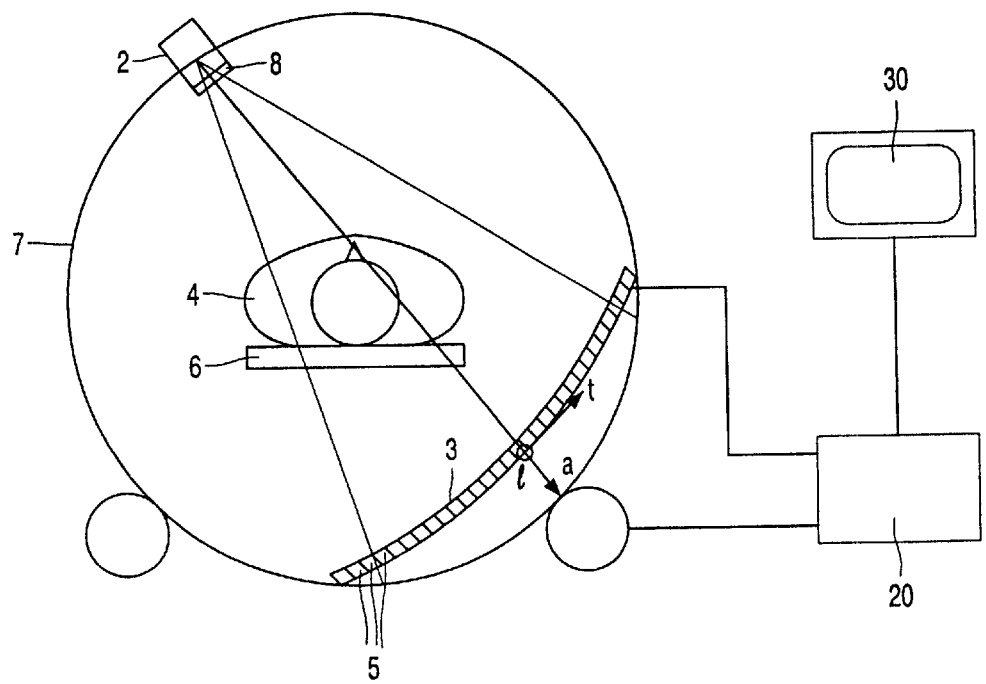
Figure 2:
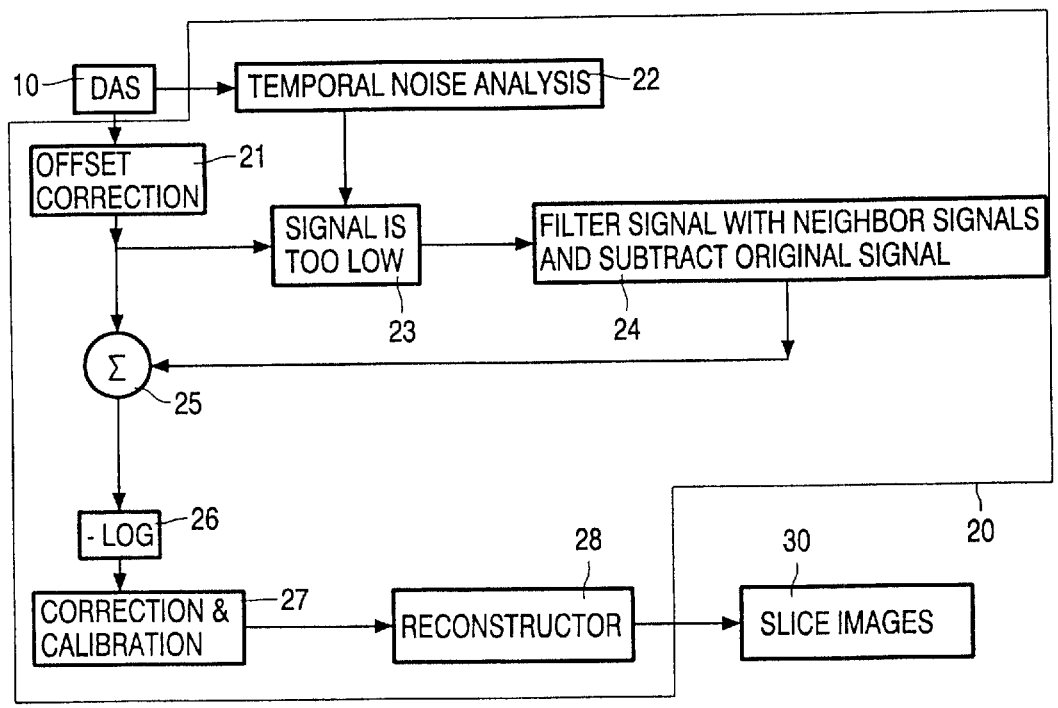

The invention will be further explained by means of the attached drawing, in which:

FIG. 1 shows diagrammatically a computed tomography device in which the invention is used, and FIG. 2 is a block schematic diagram of the essential functions of the processing unit of the CT-device according to FIG. 1 carrying out the method according to the invention.

FIG. 1 shows graphically a computed tomography device according to the invention. In co-operation with a slit-shaped collimator 8 an X-ray source 2 produces a diverging, fan-shaped or conical X-ray beam for irradiating the object 4, for example a patient to be examined. The X-ray detector 3 is arranged so as to face the X-ray source 2. The X-ray detector in the present embodiment is a position-sensitive, two-dimensional X-ray detector which includes a matrix of, for example, a plurality of parallel rows of individual detector cells 5. The detector cells 5 are, for example, gas-filled (xenon) detectors or solid-state detectors. Generally speaking, the thickness of the conical X-ray beam halfway between the X-ray source and the X-ray detector amounts to from 5 mm to 20 mm. The intensity of the radiation having traversed the patient so as to be incident on the X-ray detector is determined mainly by the absorption within the patient 4 who is positioned on a table 6 between the X-ray source and the X-ray detector. The absorption along a large number of lines is measured from a large number of axial directions by rotating the X-ray source 2 and the X-ray detector 3 together about the patient by means of a frame 7. The combined rotation of the X-ray source and the X-ray detector may be continuous but also intermittent.

Furthermore, the patient can also be displaced along the axis of rotation during irradiation and rotation, that is, in the longitudinal direction, so that the X-ray detector acquires data from a significant three-dimensional volume of the patient. FIG. 1 shows the X-ray source and the X-ray detector in a cross-section through the plane in the axial direction in which the X-ray source and the X-ray detector rotate about the patient. The axial direction in the instantaneous orientation of the X-ray source and the X-ray detector is denoted by the reference (a) in the Figure. The tangential direction (t) lies in the plane in which the X-ray source 8 and the X-ray detector 3 rotate about the patient 4 and extends perpendicularly to the axial direction (a). The longitudinal direction (l) extends perpendicularly to the plane of drawing. When the X-ray source and the X-ray detector are rotated about the patient and the X-ray source with the X-ray detector and the patient on the patient table 6 are displaced in the longitudinal direction at the same time, the X-ray source and the X-ray detector describe a helical path. In that case the instantaneous plane in which the X-ray source and the X-ray detector rotate about the patient extends through the helical path in the instantaneous positions of the X-ray source and the X-ray detector and perpendicularly to the longitudinal direction. The computed tomography device may be provided not only with a rotatable system with an X-ray source and an X-ray detector, but also with a detection system which is not rotatable but extends (substantially) completely along the circumference of the patient. Generally speaking, the X-ray source and the X-ray detector together are rotated completely about the patient, so through 360°. Alternatively, a detection system can be arranged along the entire circumference of the patient, in which case the X-ray source is rotated completely about the patient. Furthermore, an X-ray source can be used in the form of an annular anode which is arranged around the patient; the target spot of an electron beam whereby X-rays are generated from the anode material then moves around the patient together with the annular anode. It is to be noted that it suffices in principle to use a fan-shaped or conical beam which rotates about the patient through an angle which equals the sum of 180° and the angle of aperture of the fan-shaped or conical beam.

Furthermore, the computed tomography device according to the invention preferably includes a two-dimensional X-ray detector. Such a two-dimensional X-ray detector includes a large number of X-ray-sensitive detector elements that are arranged in a two-dimensional pattern, for example in a plurality of rows of detector elements, said rows being adjacently situated in the longitudinal direction. When a more or less conical X-ray beam is used, density profiles can be acquired simultaneously in respective longitudinal positions. The conical beam and the two-dimensional detector notably yield an object data set with a high uniform spatial resolution, the time required for the acquisition of the density profiles not being significantly longer than in case use is made of a fan-shaped beam and an X-ray detector with a single row of detector elements.

In each position or orientation of the X-ray source and the X-ray detector the intensity of the X-rays received by the individual detector cells is digitized and applied to a processing unit 20. The processing unit 20 converts the measured data into the data values of the patient to be examined. The processing unit reconstructs the data values in individual positions within the body of the patient from the density profiles for successive directions wherefrom the patient has been irradiated. The processing unit 20 thus forms the object data set of data values from the density profiles measured by means of the X-ray detector. For example, high and low data values in the object data set correspond to parts of the patient in which the X-ray absorption is strong and weak, respectively. The processing unit includes, for example, a computer, which is programmed so as to reconstruct the object data set and also to derive the cross-sectional distribution. Such a cross-sectional distribution may represent for example a cross-section of the patient to be examined. The processing unit is also arranged to form an image signal, for example, an electronic video signal, representing the cross-sectional distribution. The signal levels of such an image signal represent the density values of the cross-sectional distribution. The cross-sectional distribution can thus be displayed as an image on a monitor 30 that is coupled to the processing unit. The image may also be stored as a digital image matrix or be applied to an image-processing unit for further processing.

FIG. 2 schematically shows the essential parts of the CT-device of FIG. 1 for carrying out the steps of the method according to the invention. The data acquisition system is schematically shown at 10. This generally includes all elements necessary to obtain data signals representing (part of) the patient 4, such as the X-ray source 2 and the X-ray detector 3. The processing unit 20 performs the steps according to the invention, which are designated as 21 through 28 and will be described in detail below. The object images resulting from the processing unit are shown on monitor 30.

At the data acquisition system 10 the data signals representing the X-rays attenuated by absorption of the patient body are received and transferred to the processing unit 20.

The processing unit generally forms object images based on the data signals received from the data acquisition system 10. At step 21 an offset correction is performed. The data signals are corrected for the offset introduced by the measurement equipment in a manner known in the art.

At step 22 a noise analysis is performed on the data signals to establish a measure of the noise present. Preferably the standard deviation σ is determined. Various techniques are known in the art to perform noise analysis, either in time or in place. Preferably the noise analysis is performed real time or "on the fly" during measurements. It is noted that the amount of noise varies in time. The noise also varies per detector.

At step 23 the offset corrected data signals resulting from step 21 are compared with a certain ceiling value which is related to the standard deviation σ. Preferably the ceiling value is approximately 3σ. Data signals having a value below the ceiling value are processed in step 24. Data signals having a value above the ceiling value are processed in step 25.

In step 24 the data signals resulting from step 23 are again filtered and the original signal is subtracted. Various suitable filtering techniques are known in the art. Preferably the filtering includes averaging each of the data signals with data signals of neighboring detector elements 5. Neighboring data signals can be found in lateral or tangential direction t of the detector. When a two dimensional detector is used, neighboring data signals can also be found in longitudinal direction l of the detector or in any other two dimensional direction (any combination of l and t) along the detector. A suitable type of two-dimensional detector is described in a European Patent application 99203287.0 (PHN17.680).

An example of a suitable low pass filter includes a "point averaging filter", e.g. a point averaging filter with a cubic spline. This filter can be applied as well in one as in two-dimensions. Another example of a suitable low pass filter is a bounding algorithm filter, which is designed to eliminate noise peaks. A further example of a suitable low pass filter is a median filter described in U.S. Pat. No. 5,416,815. It is noted that various other suitable filters are known in the art.

In the foregoing the data signals received by the detector have so far been adaptively filtered in dependence of their data value and the magnitude of the signal noise. Thereby the data signals are preferably processed in groups of a certain number of detector readings, e.g. 30.

In step 25 the result from step 24 is added to the original signal resulting from step 21. As an alternative the result from step 24 may replace the original signal resulting from step 21 as a consequence of which this summation can be removed from the diagram.

Next in step 26 the data signals are processed to indicate the amount of attenuating material in the patient 4. In the art thereto the data signals are log adjusted by taking the negative of its algorithm. Since the data signals are filtered before taking the logarithm streak artifacts resulting from small signals and leading to the so-called "frozen noise" are successfully avoided.

In step 27 the data signals are corrected for various well-known errors, such as variations in detector and channel gains.

Finally in step 28 the data signals are reconstructed in a well-known manner to produce object images, f.i. in the form of slice mages. These slice images can be further processed and shown on monitor 30. One example of a method for processing the resulting slice images is described in a European Patent application 99203287.0 (PHN17.680).

The method according to the invention is suitable for application in medical systems, f.i for obtaining images of a patient for diagnosis or during treatment of the patient. Use can be made of various types of measurement signals, for example sound waves or X-rays. Preferably the method according to the invention is incorporated in a computed tomography device. The above description undoubtedly provides the skilled reader with all necessary information to adjust the processing unit thereof such that it can carry out the steps of the method according to the invention. This may include designing and writing a computer program.

It is noted that the invention is in no way limited to the embodiment shown in FIG. 1. In fact the invention is suitable for all types of computed tomography devices. For instance the X-ray detector can either consist of one row of detector elements (i.e. in a single-slice scanner) or two or more rows of detector elements (i.e. in a multi-slice scanner) as indicated above. Both types of CT scanners are described in the earlier filed European Application 99203287.0 (PHN17.680), which is incorporated herein by reference. As follows from the above description the shape of the X-ray beam can be a fan-shape or a cone-shape. An example of a cone beam scanner can be found in the international application WO 9936885. Theoretically the X-ray source can also be a point source and the X-ray detector can be a point detector. Furthermore the movement of the X-ray source and the X-ray detector with reference to the patient table may differ from the helical movement of the embodiment of FIG. 1. The CT-scanner may be arranged for stepwise movement of the patient table relative to the X-ray apparatus thus producing slice-to-slice scans. Alternatively the patient table may be fixed relative to the X-ray apparatus, as is the case in producing a dynamical scan or CT Fluoroscopy. This list of variations is not limitative and undoubtedly a person skilled in the art will be able to think of other variations.

Summarizing the invention provides the insight that in the method described herein streak artifacts or frozen noise are introduced by processing the measured data signals prior to filtering. The step of processing usually includes processing the data such that they reveal information about the attenuation of the data signals. In the art this includes log adjustment of the data signals. Such artifacts can be avoided by reversing the order and processing the data only after filtering. Based on this teaching several filter techniques are introduced generally leading to a better signal to noise ratio in the resulting slice images.

The invention is of course not limited to the described or shown embodiment, but generally extends to any embodiment, which falls within the scope of the appended claims as seen in light of the foregoing description and drawings.

What is claimed is:

1. A method of reducing artifacts in object images acquired by means of measurement signals sent by a source through the object onto a detector, which method comprises the steps of:
   a) adaptively filtering the data signals received by the detector in dependence of the data value;
   b) processing the data signals to indicate the attenuation of the measurement signals passing through the object; and
   c) reconstructing an image of the object based on the filtered and processed data signals, characterized in that step b) is performed on the adaptively filtered data signals resulting from step a).

2. A method according to claim 1, wherein step a) comprises the steps of filtering essentially all data signals having a value below a predetermined ceiling value.

3. A method according to claim 2, wherein the ceiling value is related to the noise present on the data signals.

4. A method according to claim 2, wherein the ceiling value essentially equals three times the standard deviation of the noise.

5. A method according to claim 1, wherein step a) further comprises the step of filtering each of the data signals with neighboring data signals.

6. A method according to claim 5, wherein the filtering is performed with neighboring data signals located in lateral direction of the detector.

7. A method according to claim 5, wherein the filtering is performed with neighboring data signals located in longitudinal direction of the object.

8. A computed tomography device comprising
   an X-ray source for irradiating an object by means of X-rays from different axial directions; and
   an X-ray detector;
   wherein the X-ray source and X-ray detector are displaceable relative to the object in longitudinal direction thereof and the X-ray detector is arranged to measure a plurality of density profiles for respective axial directions and longitudinal positions, which density profiles form an object data set of data signal values,
   which computed tomography device comprises a processing unit for carrying out the method according to claim 1.

9. A computed tomography device according to claim 8, wherein the X-ray detector is a two-dimensional detector.

10. Computer program for carrying out the method according to claim 1.

* * * * *